United States Patent

Cheng

[11] Patent Number: 5,775,822
[45] Date of Patent: Jul. 7, 1998

[54] ERGONOMIC COMPUTER KEYBOARD

[76] Inventor: Shih-Ming Cheng, 4th Floor, No. 314, Sec. 6, Chung Hsiao E. Rd., Taipei, Taiwan

[21] Appl. No.: 738,551

[22] Filed: Oct. 28, 1996

[51] Int. Cl.[6] ........................................ B41J 5/10
[52] U.S. Cl. ........................................ 400/489; 400/486
[58] Field of Search ........................ 400/489, 488, 400/486

[56] References Cited

U.S. PATENT DOCUMENTS

| D. 336,084 | 6/1993 | Choi | 400/489 |
|---|---|---|---|
| 3,945,482 | 3/1976 | Einbinder | 400/489 |
| 4,244,659 | 1/1981 | Malt | 400/489 |
| 4,483,634 | 11/1984 | Frey et al. | 400/489 |
| 4,522,518 | 6/1985 | Schmidt | 400/489 |
| 4,597,681 | 7/1986 | Hodges | 400/489 |
| 4,974,183 | 11/1990 | Miller | 400/489 |
| 5,318,367 | 6/1994 | Braun et al. | 400/488 |
| 5,360,280 | 11/1994 | Camacho et al. | 400/489 |
| 5,372,441 | 12/1994 | Louis | 400/489 |
| 5,426,449 | 6/1995 | Danzinger | 400/489 |
| 5,584,588 | 12/1996 | Harbaugh | 400/489 |
| 5,673,040 | 9/1997 | Hargreaves et al. | 400/488 |

FOREIGN PATENT DOCUMENTS 1279693  10/1968  Germany ........................ 400/489

*Primary Examiner*—Edgar S. Burr
*Assistant Examiner*—Amanda B. Sandusky
*Attorney, Agent, or Firm*—Bacon & Thomas

[57] ABSTRACT

An ergonomic computer keyboard including a front edge section, a character control section, an edit control section, and a number control section, wherein the character control section includes a left character control section and a right character control section, the left character control section and the right character control section having a respective hollow, rounded shape; the edit control section and the number control section are arranged between the left character control section and the right character control section.

5 Claims, 2 Drawing Sheets

ERGONOMIC COMPUTER KEYBOARD

BACKGROUND OF THE INVENTION

The present invention relates to computer keyboards, and relates more particularly to an ergonomic computer keyboard.

In conventional computer keyboards, the character keys are arranged together at the left side. When operating a computer keyboard, the two hands are generally suspended above the character keys. However, because the character keys of a computer keyboard are arranged together at the left side, the hands must be moved towards each other so that the fingers of the hands can move between the character keys quickly. However, because the wrists of the hands are suspended in the air, the muscles of the wrists are stretched. Therefore, one's wrist and shoulders ache soon when operating the keys. Besides, the edit key section and number key section of a conventional computer keyboard are arranged at the right side. When operating a computer keyboard, the operator usually views the edit key section and the number key section biasedly, therefore the eyes and the neck ache quickly. Furthermore, the top side of a conventional computer keyboard slopes downwards from the front side (the side remote from the operator) towards the rear side (the side near the operator), and the keys are transversely aligned in a flush manner. This is not an ergonomic design. Because the fingers have different sizes, they must be turned downwards at different angles when operating different keys. Therefore, the fingers become stiff and painful soon.

In order to eliminates the aforesaid problems, various ergonomic keyboard means have been developed. Exemplars of these ergonomic keyboard means are seen in U.S. Pat. No. 5,360,280 entitled "ERGONOMIC KEYBOARD INCLUDING ARCUATE ELONGATED KEYS"; U.S. Pat. No. 5,372,441 entitled "ERGONOMIC KEYBOARD APPARATUS WITH LEFT AND RIGHT KEY SECTION SEPARATED BY AN IRREGULARLY SHAPED SPACE"; U.S. Pat. No. 5,426,449 entitled "PYRAMID SHAPED ERGONOMIC KEYBOARD".

SUMMARY OF THE INVENTION

The present invention has been accomplished under the circumstances in view. It is the main object of the present invention to provide a computer keyboard which is ergonomically engineered. According to one aspect of the present invention, the ergonomic computer keyboard comprises a front edge section, a character control section, an edit control section, and a number control section, wherein the character control section includes a left character control section and a right character control section, the left character control section and the right character control section having a respective hollow, rounded shape; the edit control section and the number control section are arranged between the left character control section and the right character control section. Because the edit control section and the number control section are arranged in the middle between the left character control section and the right character control section, the operator can view all the keys without turning the eyes, and the operation job can be equally shared by the left hand and the right hand. According to another aspect of the present invention, the front edge section comprises a front side, a rear side, a left side, and a right side; the front edge slopes downwards from the front side towards the rear side, and bilaterally downwardly slopes from the middle towards the left side and the right side; the distance between the front side and the rear side of the front edge section is preferably within 3–7 cm so that the wrist can be well supported. According to still another aspect of the present invention, the left character control section and the right character control section have respective keys staggered and arranged at different elevations to fit the fingers.

DETAILED DESCRIPTION OF THE PREFERRED EMBODIMENT

Figure 1:
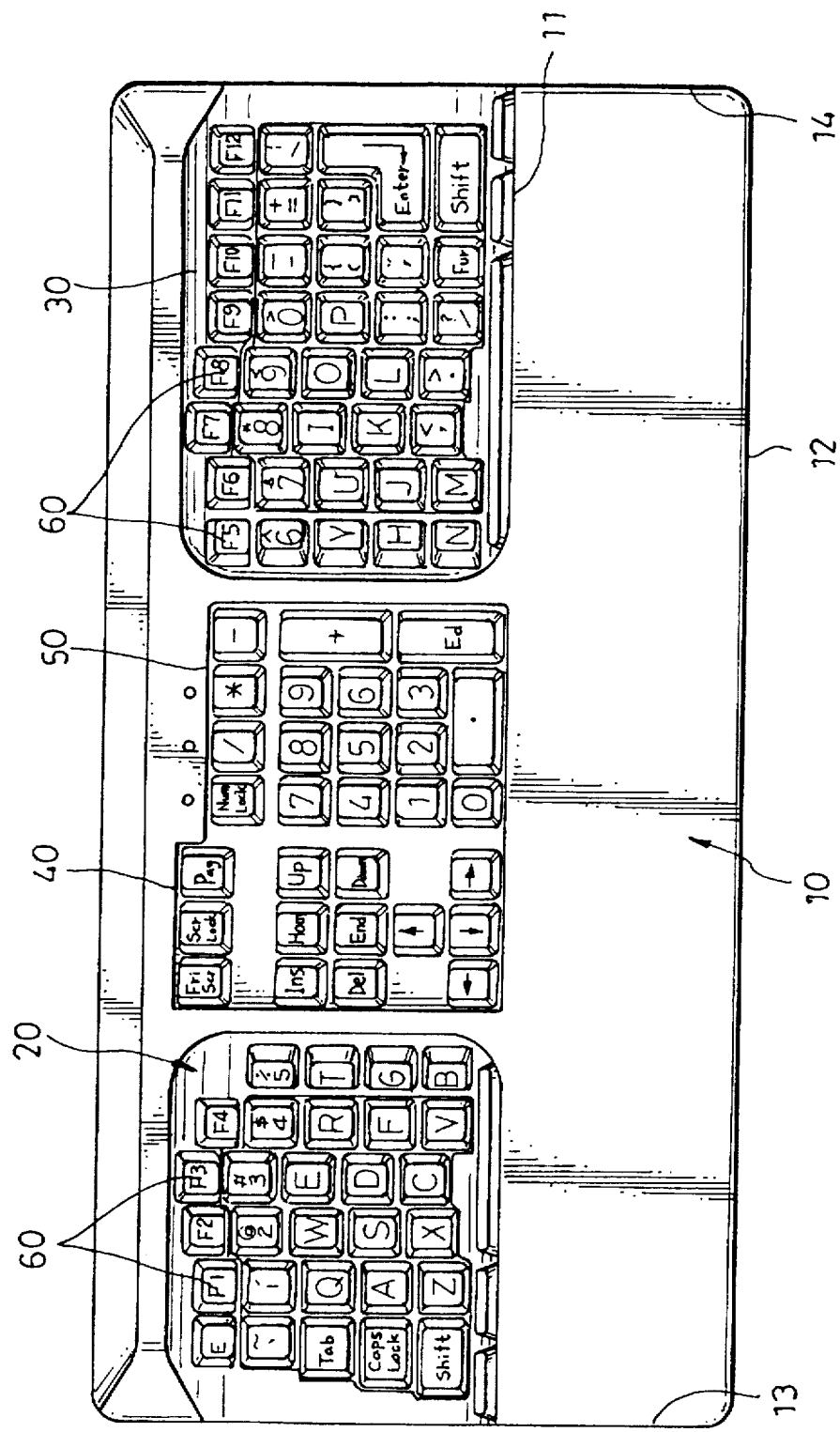
FIG. 1 is a front view of an ergonomic computer keyboard according to the present invention; and, FIG. 2 is an elevational view of the ergonomic computer keyboard shown in FIG. 1.
Figure 2:
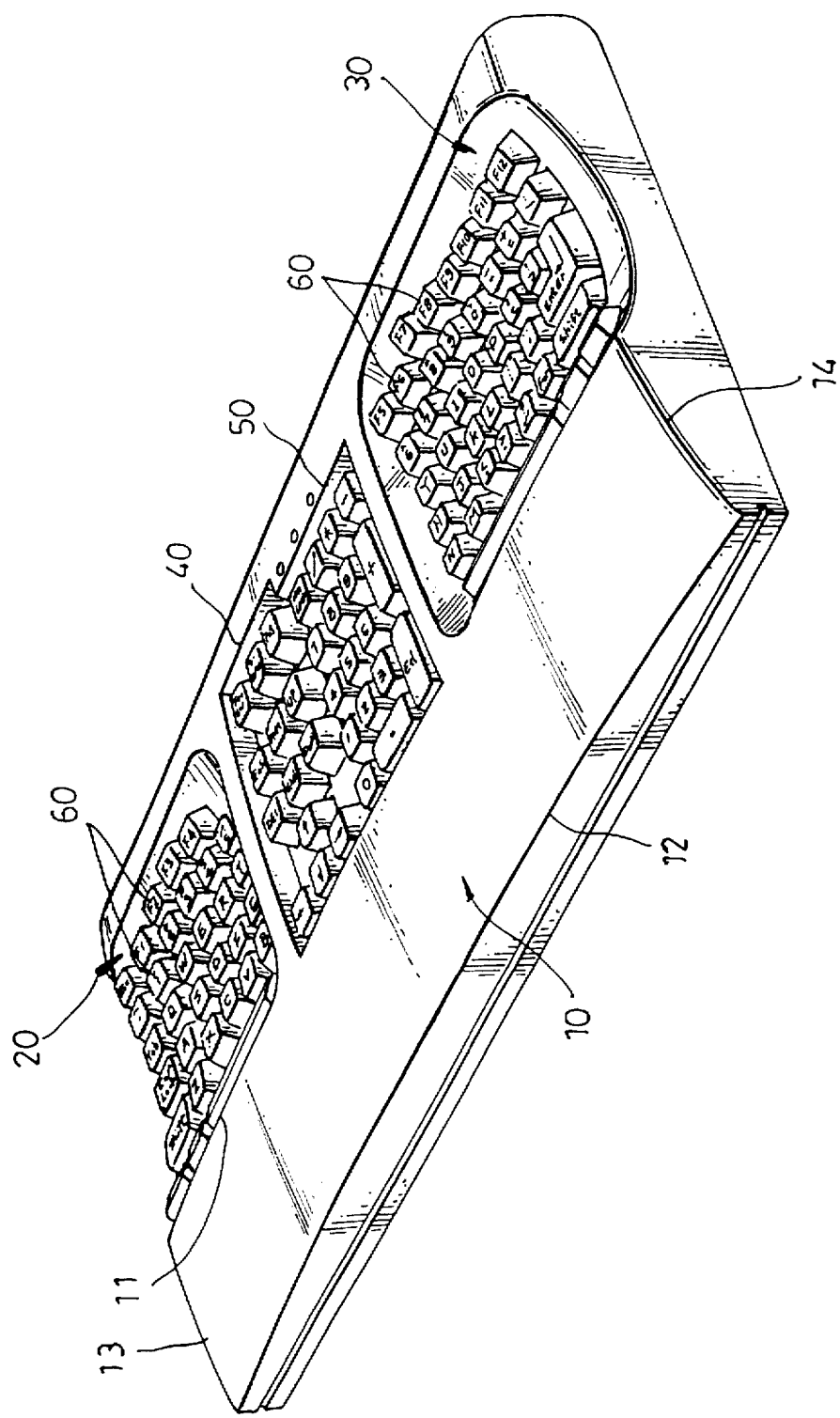

Referring to FIGS. 1 and 2, an ergonomic computer keyboard in accordance with the present invention comprises a front edge section 10, a left character control section 20, a right character control section 30, an edit control section 40, and a number control section 50.

The front edge section 10 comprises a front side 11, a rear side 12, a left side 13, and a right side 14. The front edge section 10 gradually slopes downwards from the front side 11 towards the rear side 12 (the front side is at a higher elevation, the rear side is at a lower elevation), and bilaterally downwardly slopes from the middle towards the left side 13 and the right side 14 (the middle area forms a ridge bilaterally sloping towards the left side 13 and the right side 14. The front edge section 10 is designed for supporting the wrists of the hands when operating the keys.

The left character control section 20 and the right character control section 30 have a respective hollow rounded shape, and respective keys 60 disposed at different elevations and not well aligned.

The edit control section 40 and the number control section 50 are arranged between the left character control section 20 and the right character control section 30.

When in use, the wrists are rested on the front edge section 10, permitting the left hand and the right hand to be reached naturally to the left character control section 20 and the right character control section 30.

It is to be understood that the drawings are designed for purposes of illustration only, and are not intended as a definition of the limits and scope of the invention disclosed.

What the invention claimed is:

1. An ergonomic computer keyboard comprising:
    a) left and right spaced apart character control sections each having a plurality of rows of keys disposed in a concave keyboard portion;
    b) an edit control section and a number control section located between the spaced apart character control sections, the edit control section and the number control section each having a plurality of keys and both being located in a recessed portion of the keyboard; and,
    c) a front edge section for supporting wrists of a keyboard user, the front edge section having a front side located adjacent to a row of keys in each of the character control sections whereby a height of the front side is above a height of the adjacent row of keys.

2. The ergonomic computer keyboard of claim 1 wherein said front edge section further comprises a rear side, a left side, and a right side, said front edge sloping downwards from said front side towards said rear side, and bilaterally downwardly sloping from a middle toward said left side and said right side.

3. The ergonomic computer keyboard of claim 2 wherein a distance between said front side and said rear side of said front edge section is between 3–7 cm.

4. The ergonomic computer keyboard of claim 1 wherein at least one row of the plurality of rows of keys in said left character control section and said right character control section have respective keys aligned in a non-linear configuration.

5. An ergonomic computer keyboard comprising:
 a) left and right spaced apart character control sections each having a plurality of rows of keys disposed in a concave keyboard portion;
 b) an edit control section and a number control section located between the spaced apart character control sections, the edit control section and the number control section each having a plurality of keys and both being located in a recessed portion of the keyboard; and,
 c) a front edge section for supporting wrists of a keyboard user, the front edge section extending linearly across a width of the keyboard without interruption.

* * * * *